United States Patent [19]

Miyata

[11] Patent Number: 4,858,110
[45] Date of Patent: Aug. 15, 1989

[54] PARALLEL DATA PROCESSOR WITH SHIFT REGISTER INTER-PROCESSOR TRANSFER

[75] Inventor: Hiroyuki Miyata, Kamakura, Japan

[73] Assignee: The President of the Agency of Industrial Science and Technology, Tokyo, Japan

[21] Appl. No.: 29,637

[22] Filed: Mar. 24, 1987

[30] Foreign Application Priority Data

Feb. 5, 1987 [JP] Japan .................................. 62-23555

[51] Int. Cl.⁴ ............................................ G06F 15/16
[52] U.S. Cl. .................................. 364/200; 364/231.9; 364/229; 364/229.1; 364/238.7; 364/270.7
[58] Field of Search ................... 364/200 MS, 900 MS

[56] References Cited

U.S. PATENT DOCUMENTS

| | | | |
|---|---|---|---|
| 3,582,899 | 6/1971 | Semmelhaak | 364/200 |
| 4,174,514 | 11/1979 | Sternberg | 364/200 X |
| 4,215,401 | 7/1980 | Holsztynski et al. | 382/49 X |
| 4,380,046 | 4/1983 | Fung | 364/200 |
| 4,418,383 | 11/1983 | Doyle et al. | 364/200 |
| 4,580,215 | 4/1986 | Morton | 364/200 |

FOREIGN PATENT DOCUMENTS 56-123069 9/1981 Japan .

Primary Examiner—Eddie P. Chan
Assistant Examiner—Paul Kulik
Attorney, Agent, or Firm—Robert M. Isackson

[57] ABSTRACT

A parallel data processor is disclosed, in which a plurality of fundamental computing elements each comprising a computer and a memory are connected in a two-dimensional lattice configuration, each of said fundamental computing elements being operated by an identical instruction provided by a single control section, and in which said each fundamental computing element is provided with a shift register having ability of data transmission to the memory in said element and of further data transmission, which is asynchronous to operation in said element, between the adjacent fundamental computing elements, said latter data transmission being conducted concurrently to the operation in said element.

3 Claims, 4 Drawing Sheets (1) Data Transmission between PEs 1

(2) Operation in PE 1

(3) Data Transmission between PEs 1

(1) Data Transmission between PEs 1

(2) Operation in PE (3) Data Transmission between PEs 1

PARALLEL DATA PROCESSOR WITH SHIFT REGISTER INTER-PROCESSOR TRANSFER

FIELD OF THE INVENTION

This invention relates to a parallel data processor comprising a plurality of fundamental computing elements (hereinafter referred to as PE) connected in a two-dimensional lattice pattern for enabling data transmission therebetween.

BACKGROUND OF THE INVENTION

Hitherto, there has been proposed a parallel data processor in which a plurality of PE of the identical structure are arranged in a two-dimensional lattice configuration, each of said PE being connected in an adjoining relation and operated by an identical instruction provided by an external control section and each PE providing therein a means for storing the status signals and a means for selecting one of the operations by the status signal so that each input signal from the adjoining PE and the data signals stored in the PE are transferred into the computing system just as disclosed in the Japanese laid-open patent publication No. 56-123069.

An arrangement of PE according to the foregoing conventional parallel data processor is shown in FIG. 8 which comprises a PE 2, a selector 21 for selecting data from the adjacent PE 2, a register file 22, a two-input ALU 23, a selector 24 for selecting an input to the two-input ALU 23 and a selector 25 for selecting data to the adjacent PE 2.

Operation of the PE in the conventional parallel data processor will now be described hereinbelow. In the operation within the PE, two data are taken up from the register file 22 and operated in the two-input ALU 23, a result of which is stored in the register file 22 repeatedly. When data transmission should be conducted between the PEs 2, the data is read out from the register file 22 of the PE 2 on the data-feeding side and is fed through each selector 24, 25 to the adjacent PE 2. If the PE 2 having received the data is a relevant PE, then the data is transmitted through each selector 21, 24 and the 2-input ALU 23 to the register file 22 for its storage. If the PE 2 has received the data for mere transfer purpose, on the contrary, the data is transmitted through each selector 21, 25 to the adjacent PE 2.

In this way, the data transmission between the PEs 2 may be conducted on the same periodic basis using the register file 22 and the 2-input ALU 23.

In the PE 2 thus constructed in the conventional parallel data processor, however, the data transmission betwee the PEs 2 requires synchronization to the operation in the PE 2 using the register file 22 and the 2-input ALU 23 and the PE 2 cannot be operated for other purposes during the data transmission between the PEs 2.

In other words, the synchronization in the PEs 2 is determined by the read-out and write-in of the register file 22 as a computing center and by the operation time in the 2-input ALU 23, while the data transmission between the PEs, which should be completed at a higher speed, spends a longer wasteful time. Further, during the data transmission between the PEs, the register file 22 associated with such data transmission may prohibit another operation in the PE.

For this reason, the parallel data processor including a plurality of PEs connected in the two-dimensional lattice pattern is excellent in its extendability and may be readily improved in its performance, but has a problem of delayed data transmission requiring a longer time therefor between the PEs.

Accordingly, an object of the invention is to solve the above problem and to provide a parallel data processor having ability of transmitting the data between the PEs at a higher speed by means of asynchronous data transmission relative to operation in the PE and of concurrent data transmission independently from the operation in the PE.

SUMMARY OF THE INVENTION

In order to achieve the above object, the invention provides a parallel data processor comprising a plurality of fundamental computing elements connected in a two-dimensional configuration, each including a computer and a memory and being operated by an identical instruction provided by a single control section, the improvement in that said each fundamental computing element is provided with a shift register having ability of data transmission to the memory in said element and of further data transmission, which is asynchronous to operation in said element, between the adjacent fundamental computing elements, said latter data transmission being conducted concurrently to the operation in said element, thereby to achieve the data transmission between the fundamental computing elements (or PEs) at a higher speed.

In accordance with the parallel data processor of the invention, the data transmission between the fundamental computing elements (or PEs) may be conducted at the high speed independently and asynchronously relative to the operation in the PE after the data to be transmitted between the PEs has been transferred from the memory to the shift register. After the data reaches a target PE, the data is fed back from the shift register to the memory, thereby to complete the operation.

For better understanding, the invention will now be described hereinbelow for its preferred embodiments in more detail with reference to the accompanying drawings.

PREFERRED EMBODIMENTS OF THE INVENTION

Figure 1:
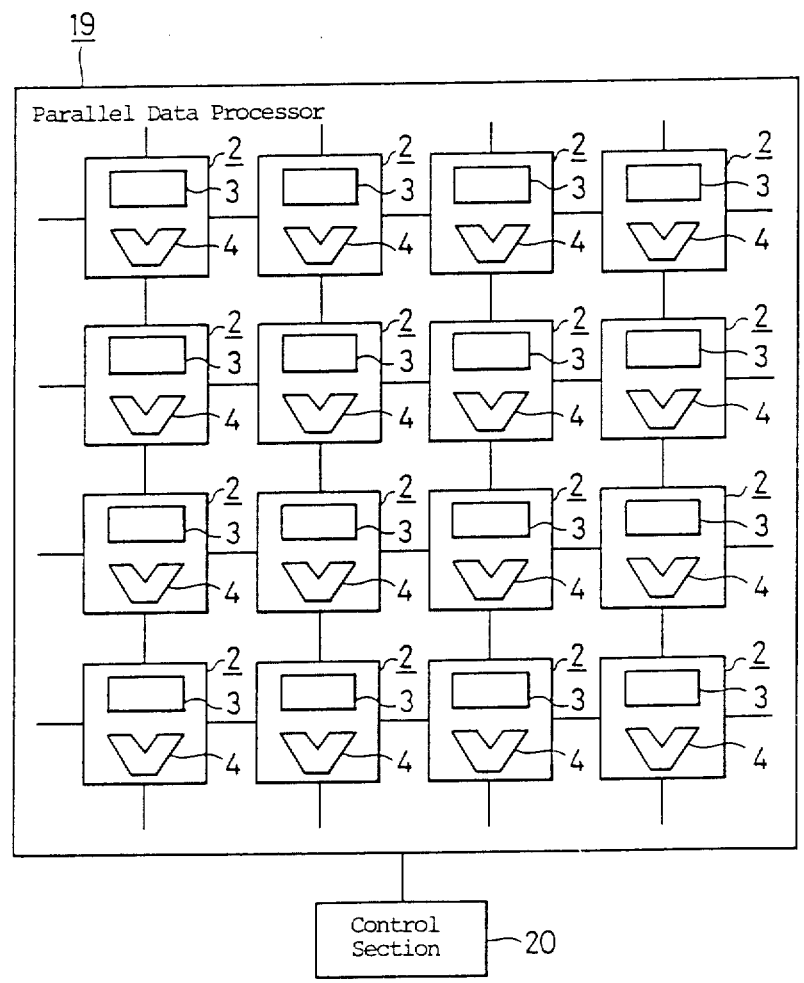
FIG. 1 is a block diagram showing the example of construction of the parallel data processor according to the invention.

FIG. 1 is a block diagram showing the example of construction of the parallel data processor according to the invention, which comprises a PE 2 provided with a memory 3 and an ALU 4 having a computing function. Reference 19 represents an example of parallel data processor comprising 4×4 pieces of PE 2, each of which may treat concurrently an identical instruction provided by a control section 20. Further, each PE 2 may transmit data only to an adjacent PE 2 in the north, east south or west.

Figure 2:
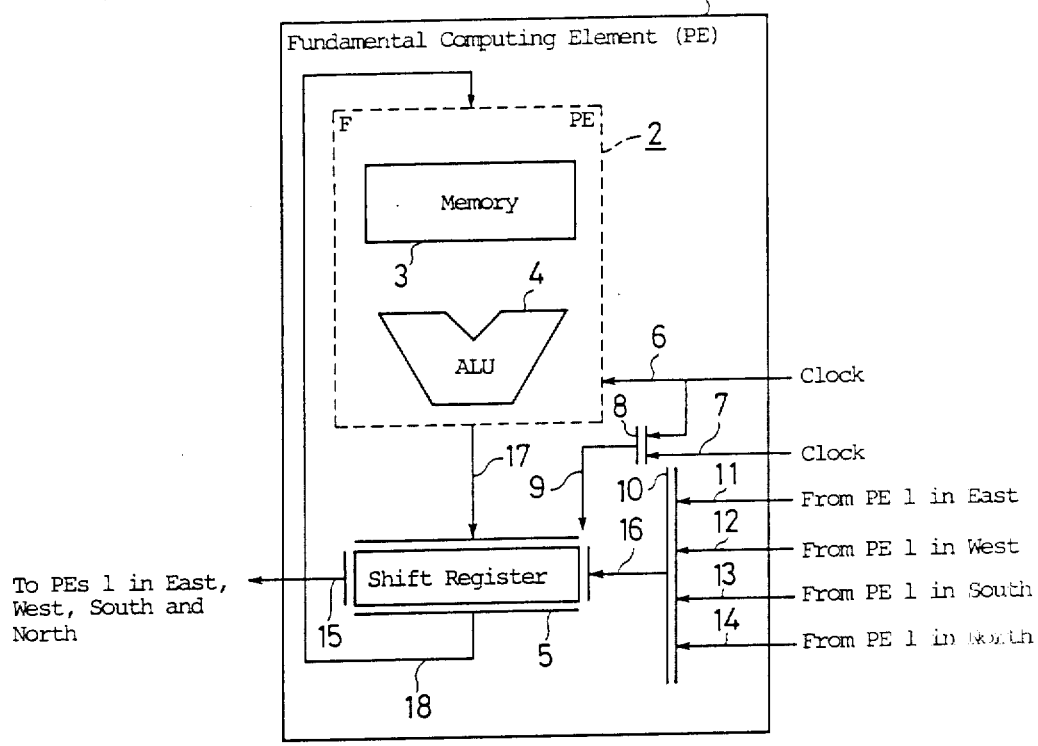
FIG. 2 is a block diagram of one embodiment of a PE construction in the parallel data processor according to the invention.
Figure 8:
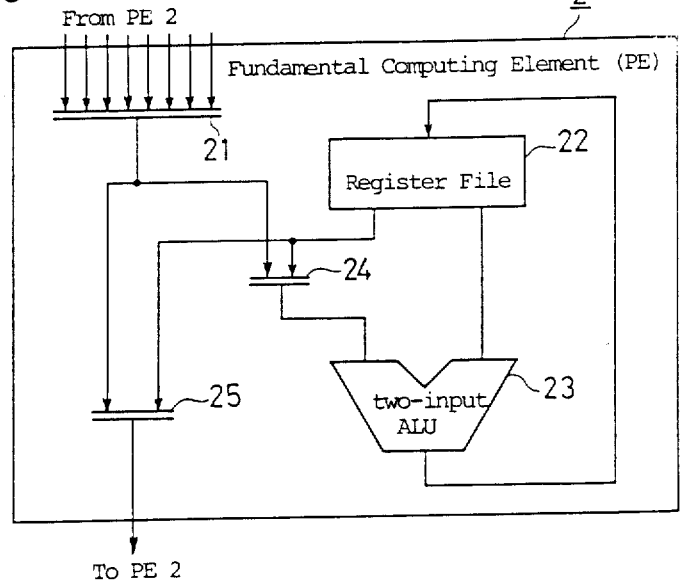
FIG. 8 is a block diagram of a PE construction in the convetional parallel data processor.

FIG. 2 is a block diagram of one embodiment of a PE construction in the parallel data processor according to the invention. In the description hereinafter for the drawings, the same references will be utilized for showing the same or equivalent part in each Figure. In FIG. 2, reference 1 stands for a PE forming the parallel data processor according to the invention, while reference 2 represents the same PE as in the conventional apparatus including the memory 3 and the ALU 4. Reference 5 represents a shift register arranged according to the invention, which may store the data from the memory 3 via a writing-in line 17 and write a value of the shift register 5 into the memory 3 via a reading-out line 18. A bit number of the shift register 5 is unnecessary to be specified.

In the embodiment as shown in FIG. 2, the data transmission is possible in parallel between the shift register 5 and the memory 3 but may be effected with shifting per one bit unit. Reference 10 represents a selector for determining data of which adjacent PEs 1 should be selected, while references 11 to 14 represent lines for inputting one bit data from each of the adjacent east, west, south and north PEs 1. Reference 16 stands for a line for inputting the data selected by the selector 10 into the shift register 5, while reference 15 represents a line for feeding sequentially each one bit of outputs from the shift register 5 toward adjacent four PEs 1 in the east, west, south and north.

Operation of the shift register 5 includes operation of the data transmission relative to the memory 3 in the PE 1 and operation of the data shift between the adjacent PEs due to the data transmission therebetween, both of which may be asynchronous with the former being synchronous to the operation in the PE 1 while the latter being carried out by means of a high speed clock. Reference 6 represents a clock line to be used for the operation as well as the data transmission between the memory 3 and the shift register 5, while reference 7 represents a high speed clock line to be used for the shift register 5 during the data transmission between the PEs 1. Reference 8 stands for a selector for selecting one of two clock lines 6, 7 for the shift register 5, while reference 9 stands for a clock line for the shift register 5.

Figure 3:
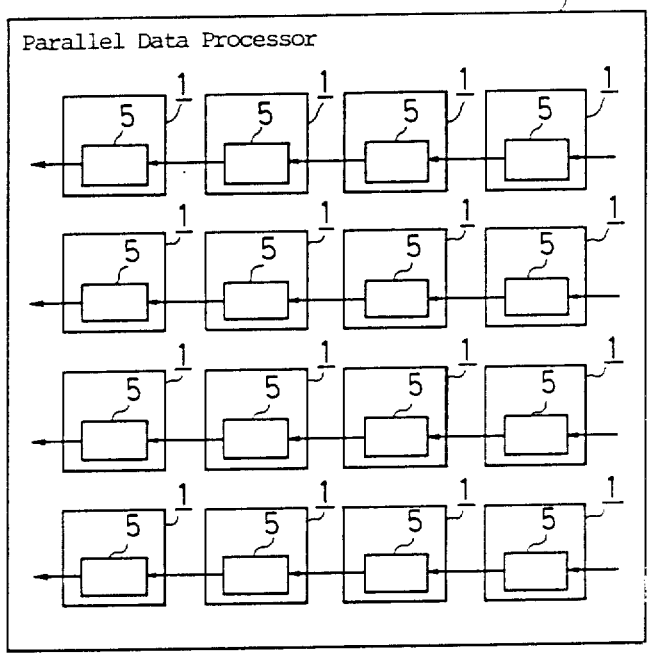
FIGS. 3 and 4 are block diagrams showing, respectively, the example of connection of shift registers for the data transmission between the PEs to the west (FIG. 3) and to the north (FIG. 4) in the parallel data processor, as shown in FIG. 2.
Figure 4:
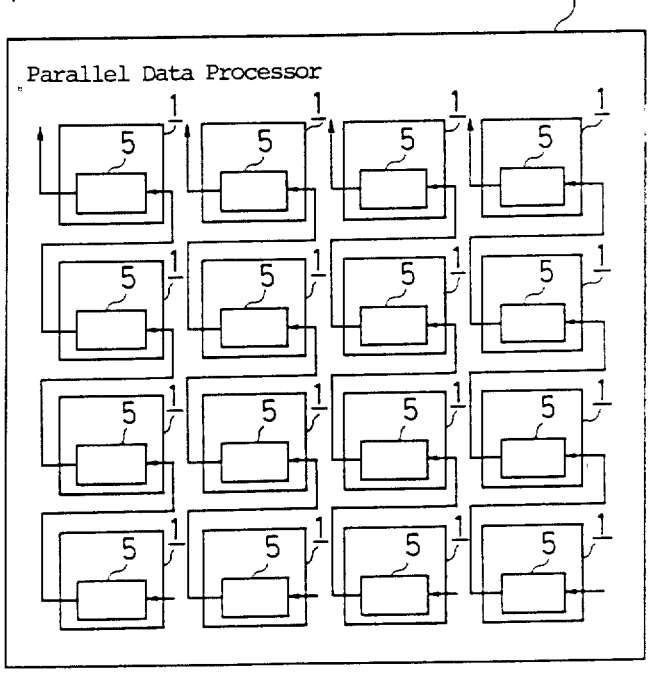
Figure 5:
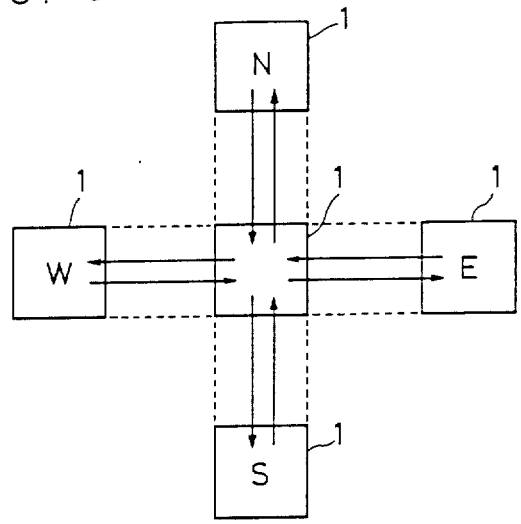
FIG. 5 is a block diagram of a construction useful for comparing a performance of a conventional apparatus with that of the inventive apparatus.
Figure 6:
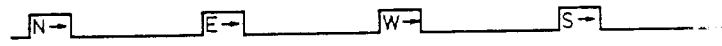
FIGS. 6 and 7 show time charts obtained by using the conventional apparatus and the inventive apparatus, respectively, as the construction of FIG. 5.
Figure 6:
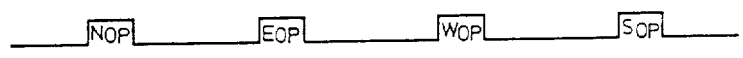
Figure 6:
Figure 7:
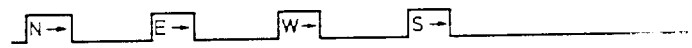
Figure 7:
Figure 7:

FIGS. 3 and 4 are block diagrams showing, respectively, the example of connection of shift registers for the data transmission between the PEs to the west (FIG. 3) and to the north (FIG. 4) in the parallel data processor, as shown in FIG. 2; FIG. 5 is a block diagram of a construction useful for comparing a performance of a conventional apparatus with that of the inventive apparatus; and FIGS. 6 and 7 show time charts obtained by using the conventional apparatus and the inventive apparatus, respectively, as the construction of FIG. 5.

Operation of the parallel data processor according to the invention will now be described.

At first, a procedure for the data transmission between the PEs will be described, which includes:

(1) reading-out from the memory 3, (2) data transmission between the PEs by means of the shift register 5, (3) writing into the memory 3, and (4) repetition of steps (1) to (3).

(1) Reading-out from The Memory 3

Both the memory 3 and the shift register 5 are operated through the clock line 6 for reading-out the transmission data from the memory 3 and then storing the data into the shift register 5 through a writing-in line 17. Thereafter, a PE in PE 1 is separated from the shift register 5 and the operation may be continued irrespective of the data transmission between the PEs 1 till the step (3) of writing into the memory 3.

(2) Data Transmission between The PEs by Means of The Shift Register 5

The data stored in the shift register 5 is transmitted between the PEs 1 independently of the operation, using the high speed clock. In case of the data transmission to the west between the PEs 1, for example, the shift register 5 in the PE 1 forms a shift register for shifting to the west, as shown in FIG. 3. This shifting operation between the shift registers 5 permits the data transmission between the PEs 1. Similarly, the data transmission to the north between the PEs 1 is followed, as shown in FIG. 4.

Such operation comprises only the shift operation between the shift registers 5 and thus does not require such clock cycle as for the operation. For this reason, the high speed clock is used, which is asynchronous to the operation. Further, this operation is not associated with the memory 3 and the ALU 4 for the operation and thus may be conducted independently of the operation in the PE 1.

(3) Writing into The Memory 3

After the data transmission between the PEs 1, the data reaching the shift register 5 of the target PE 1 is written into the memory 3. In this case, the clock line 9 for the shift register 5 is switched to the clock line 6 for the operation.

(4) Repetition of The Steps (1) to (3)

If the data to be transmitted between the PEs 1 cannot be sufficiently put into the shift register 5, then the steps of (1) to (3) should be repeated.

The high speed performance of the processor according to the invention will be compared qualitatively with that of the conventional processor, using the embodiment, as shown in FIG. 5. Namely, the data is fed from the PE 1, which is remote therefrom by optional PE number in the east, west, south and north for the operation, a result of which is fed back to the initial PE 1.

Such operation of the conventional apparatus is shown in FIG. 6, in which a symbol (N→) represents the data transmission between the PEs 1 from the north PE to the target PE, while a symbol (→N) represents the data transmission between the PEs from the target PE to the north PE (and in the same way for the PE of east (E), west (W) and south (S)). A symbol (Nop) represents the operation for the data fed from the north PE 1 (and in the same way for E, W and S).

The same operation according to the invention is shown in FIG. 7, in which both the data transmission and the operation in the PE 1 may be carried out concurrently. In addition, the data transmission between the PEs 1 may be carried out asynchronously to the operation in the PE 1 at a high speed, such as at a double speed compared with the speed of the data transmission between the PEs 1, as shown in FIG. 6. The data transmission cannot be carried out concurrently in both directions, but a considerably high speed may be achieved relative to that of the conventional apparatus.

Although the data transmission between the PEs 1 using the shift register 5 has been described, the above embodiment may be utilized for the data input and output. Since operation of the data input and output to the parallel data processor consumes much time, the processor according to the invention permits the speedy input and output of the data. In case of using the shift register 5 as the data input and output, however, the data transmission only to a single direction is sufficient, so that the selector 10 or the like is unnecessary. Further, in case of using the processor according to the invention for both the data transmission between the PEs 1 and for the data input and output, there may be provided two shift registers 5 in the PE and their associated circuits.

As described hereinabove, the parallel data processor according to the invention comprises the shift register in each PE capable of the independent and asynchronous data transmission between the adjacent PEs, so that the significant effect of the speedy data transmission between the PEs may be achieved in comparison with the conventional apparatus of this type.

What is claimed is:

1. A parallel data processor comprising:
   a plurality of fundamental computing elements (1) interconnected in a two-dimensional lattice configuration, each computing element (1) further comprising:
   a computer unit (2) including a memory unit (3) and having a first speed of operation for processing data;
   a shift register (5) connected to said computer unit (2) for transmitting data therebetween and connected to shift registers of a plurality of adjacent fundamental computing elements (1) in the lattice configuration for transmitting data therebetween;
   a first clock means (6) for controlling said shift register (5) to transmit data between said shift register (5) and said memory unit (3) of computer unit (3) at a first rate that is synchronous to the first speed of operation of said computer unit (2), said first clock means (6) being connected to said computer unit (2) and said shift register (5);
   a second clock means (7) for controlling said shift register (5) to transmit data between said shift registers of said plurality of adjacent fundamental computing elements (1) at a second rate that is asynchronous to and faster than said first rate;
   a selector means (8) for enabling one of said first or second clock means (6,7) to control said shift register (5) so that data transmission within each fundamental computing element occurs at said first rate synchronously with said computer unit operation and so that data transmission between each said adjacent fundamental computing element occurs at said second rate asynchronously and independently of said computer unit operation; and
   a control station (20) for providing an identical instruction to each of said plurality of said fundamental computing elements (1) for operating said plurality of fundamental computing elements.

2. A method for transmitting data in a parallel data processor having a plurality of fundamental computing elements (1) interconnected in a two-dimensional lattice configuration, each fundamental computing element (1) having a computer unit (2) including a memory unit (3) for storing data and having a first speed of operation for processing data, and a shift register (5) for transmitting data to and from said memory (3) at a first speed corresponding to the speed of operation of the computer unit (2) and to and from a second plurality of adjacent fundamental computing elements (1) in the lattice configuration at second speed, said second speed different from said first speed, the method comprising the steps of:
   operating the computer unit (2) of a first fundamental computing element (1) at said first speed;
   transmitting data between a memory (3) of said first fundamental computing element (1) and the shift register (5) of said first fundamental computing element (1) at said first speed;
   transmitting data between the shift register (5) of said first fundamental computing element and the shift registers of said second plurality of fundamental computing elements adjacent to said first fundamental computing element (1) at said second speed; and
   continuing operation of the computer unit (2) of the first fundamental computing element at said first speed independently of and concurrently with the transmission of data between the shift registers of said first and said second fundamental computing elements at said second speed.

3. The method of claim 2 further comprising transmitting the data from the shift register of one of said second plurality of adjacent fundamental computing elements to a memory unit of said one adjacent second fundamental computing element at said first speed.

* * * * *